A. P. STARK.
NUT LOCK.
APPLICATION FILED DEC. 17, 1912.
1,077,763.
Patented Nov. 4, 1913.
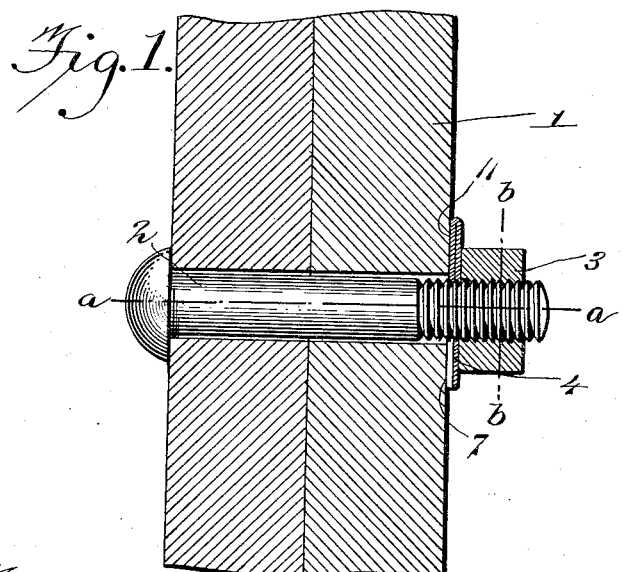
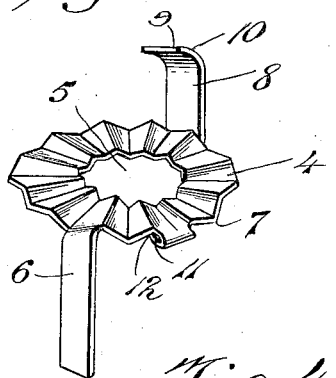
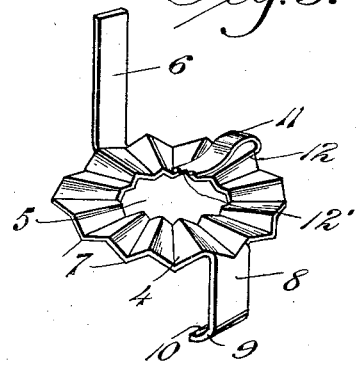
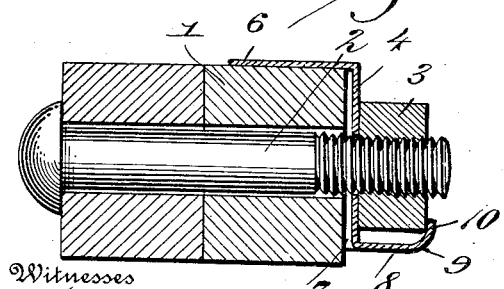
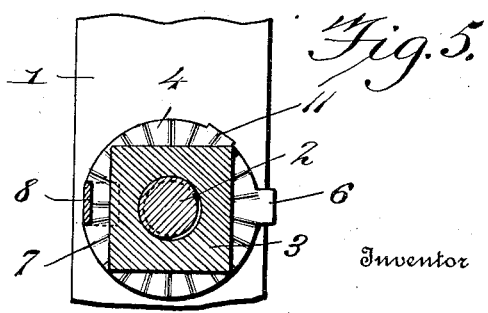
Witnesses
W. S. McDowell
J. W. Garner
Inventor
Alma P. Stark
By Victor J. Evans
Attorney

UNITED STATES PATENT OFFICE.

ALMA P. STARK, OF SPANISH FORK, UTAH.

NUT-LOCK.

1,077,763.  Specification of Letters Patent.  Patented Nov. 4, 1913.

Application filed December 17, 1912.  Serial No. 737,322.

*To all whom it may concern:*

Be it known that I, ALMA P. STARK, a citizen of the United States, residing at Spanish Fork, in the county of Utah and State of Utah, have invented new and useful Improvements in Nut-Locks, of which the following is a specification.

This invention is an improved nut lock for use for locking the nuts of bolts of railway joints and also adapted for use in locking bolt nuts on various kinds of machinery and other devices, the object of the invention being to provide an improved device of this kind which is cheap and simple, is very strong and durable, may be readily installed and which serves to prevent the turning of the bolt as well as to prevent the casual turning of the nut on the bolt.

The invention consists in the construction, combination and arrangement of devices hereinafter described and claimed.

In the accompanying drawings:—Figure 1 is a sectional view of a nut lock constructed in accordance with my invention, showing the same in operative relation to a bolt, a nut and a base or object through which the bolt extends. Fig. 2 is a detail perspective view of my improved nut locking device, showing the outer side thereof. Fig. 3 is a similar view of the same, showing the inner side thereof. Figs. 4 and 5 are detail sectional views on the planes indicated by the lines $a$—$a$ and $b$—$b$, respectively, of Fig. 2.

For the purposes of this specification, a bar or other object forming a base or support is indicated at 1, a bolt which extends through an opening in the object or base is indicated at 2 and the nut on the bolt at 3.

In accordance with my invention, I provide a washer 4 which is preferably made of spring sheet steel but may be made of any other suitable material. This washer has a central opening 5 through which the bolt may extend and the washer is adapted to be placed on the base or object through which the bolt extends to bear between said base and the inner side of the nut.

From one side of the washer projects a holding arm 6 which is here shown as radially arranged and which is adapted to be bent on one side of the base to engage with the latter to prevent the washer from turning. Also, to prevent the washer from turning, the latter is formed with radial corrugations, the ribs 7 of which corrugations are provided with biting edges to engage the surface of the base so that when the washer is clamped against the base by the action of the nut, the washer is prevented from turning. The washer also has a locking arm 8 which projects radially and is bent up therefrom and arranged at one side of the nut to prevent the latter from turning. This locking arm is a spring and its outer end is bent as at 9 to form a lip which projects against one side of the nut being rounded as at 10. Hence, the said lip, owing to the resilient action of the locking arm holds the nut in place against casual turning and yet the locking arm yields to permit the nut to be turned by design when a wrench is employed on the nut. I also provide the washer with a bolt engaging arm 11 which is here shown as struck up therefrom and integral therewith, this bolt engaging arm being coincident with and lying in one of the channels 12 formed between the ribs of the corrugations 7, being bent inwardly under the washer, and its inner end, which is of such length as to engage one side of the bolt is serrated as at 12'. This bolt locking arm is curved longitudinally, is preferably arranged in a compound curve as here shown and, owing to its being a spring and also owing to its length the said arm when the washer is clamped between the base and the nut is straightened and lengthened to some extent by the resulting pressure so that the serrated end becomes engaged with one side of the bolt and the latter is prevented from turning.

I would have it understood that the holding arm, the nut locking arm and the bolt locking arm may be arranged at any desired points on the washer and at any suitable angle with respect to one another and I would also have it understood that while I have herein shown and described a preferred form of my invention, changes may be made in the form, proportion and construction of the several parts without departing from the spirit of my invention and within the scope of the appended claim.

I claim:—

A nut locking washer having means on its outer side to engage the nut on a bolt and also provided on its inner side with a longitudinally curved spring bolt locking arm adapted by pressure to extend longitudinally and engage its inner end with one side of the bolt on which the washer is used, the said washer being also provided with radial corrugations and the said bolt locking arm being arranged in one of the channels formed by said corrugations.

In testimony whereof I affix my signature in presence of two witnesses.

ALMA P. STARK.

Witnesses:
A. F. ENGBERG,
CHAS. T. KENDALL.

Copies of this patent may be obtained for five cents each, by addressing the "Commissioner of Patents, Washington, D. C."